United States Patent
Simmons et al.

(10) Patent No.: US 6,396,488 B1
(45) Date of Patent: May 28, 2002

(54) SYSTEM AND METHOD FOR DETERMINING A PATH IN A GRAPHICAL DIAGRAM

(75) Inventors: Craig R. Simmons, Garland; Brad E. Merkle, McKinney, both of TX (US)

(73) Assignee: Corel Inc., Ottawa (CA)

( * ) Notice: Subject to any disclaimer, the term of this patent is extended or adjusted under 35 U.S.C. 154(b) by 0 days.

(21) Appl. No.: 09/226,176

(22) Filed: Jan. 4, 1999

(51) Int. Cl.[7] .................................................. G06F 3/14
(52) U.S. Cl. ........................ 345/353; 345/810; 345/840; 345/854
(58) Field of Search .................. 345/339, 440, 345/356, 357, 967, 810, 835, 840, 619, 853, 854

(56) References Cited

U.S. PATENT DOCUMENTS

| | | | |
|---|---|---|---|
| 5,321,838 A | 6/1994 | Hensley et al. | 395/700 |
| 5,428,618 A | 6/1995 | Ueki et al. | 371/19 |
| 5,448,739 A | 9/1995 | Jacobson | 395/700 |
| 5,481,668 A * | 1/1996 | Marcus | 345/440 |
| 5,786,814 A | 7/1998 | Moran et al. | 345/328 |
| 5,838,313 A | 11/1998 | Hou et al. | 345/302 |

OTHER PUBLICATIONS

Lai and Danaher "An Intelligent Interface for Diagram Navigation" "ANZIIS–95: Proceedings of the Third Australian and New Zealand Conference on Intelligent Information Systems," in 1995, pp. 270–275.*

Dr. Steve Sanoff; "Live Model: A platform for model–based tool development and integration"; Oct. 20–23, 1997; all.

IntelliCorp, Inc.; Letter to "Live Model: SAP R/3 Edition" Customer; Nov. 11, 1997; all.

IDS Scheer; "Aris Product Suite 4.0 Road Show"; Jul. 1998; all.

IntelliCorp, Inc.; "Live Model: SAP R/3 Edition Version 2.0.3 Release Notes"; Nov. 11, 1997; all.

* cited by examiner

Primary Examiner—Raymond J. Bayerl
Assistant Examiner—Thomas T. Nguyen
(74) Attorney, Agent, or Firm—Baker Botts L.L.P.

(57) ABSTRACT

A system for determining a path in a graphical diagram includes a processor coupled to an input device, an output device, a memory, and a data retrieval device. The processor executes an application to determine a path through a portion of a graphical diagram, to record path information defining the path, and to reproduce a copy of the path using the path information.

26 Claims, 4 Drawing Sheets

FIG. 3

| GRAPHICAL SHAPE ID | STATUS | PROPERTIES |
|---|---|---|
| LEVEL ONE OBJECT ONE | Y | PROCESS OBJECT |
| LINE 52a | Y | COUPLES LEVEL ONE OBJECT ONE TO LEVEL TWO OBJECT ONE |
| LEVEL TWO OBJECT ONE | Y | DECISION OBJECT |
| LINE 52b | Y | COUPLES LEVEL TWO OBJECT ONE TO LOGICAL CONNECTOR 54a |
| LOGICAL CONNECTOR 54a | N | "OR" FUNCTION |
| LINE 52c | N | COUPLES LOGICAL CONNECTOR 54a TO LEVEL THREE OBJECT ONE |
| LEVEL THREE OBJECT ONE | N | FUNCTION OBJECT |
| ⋮ | ⋮ | ⋮ |

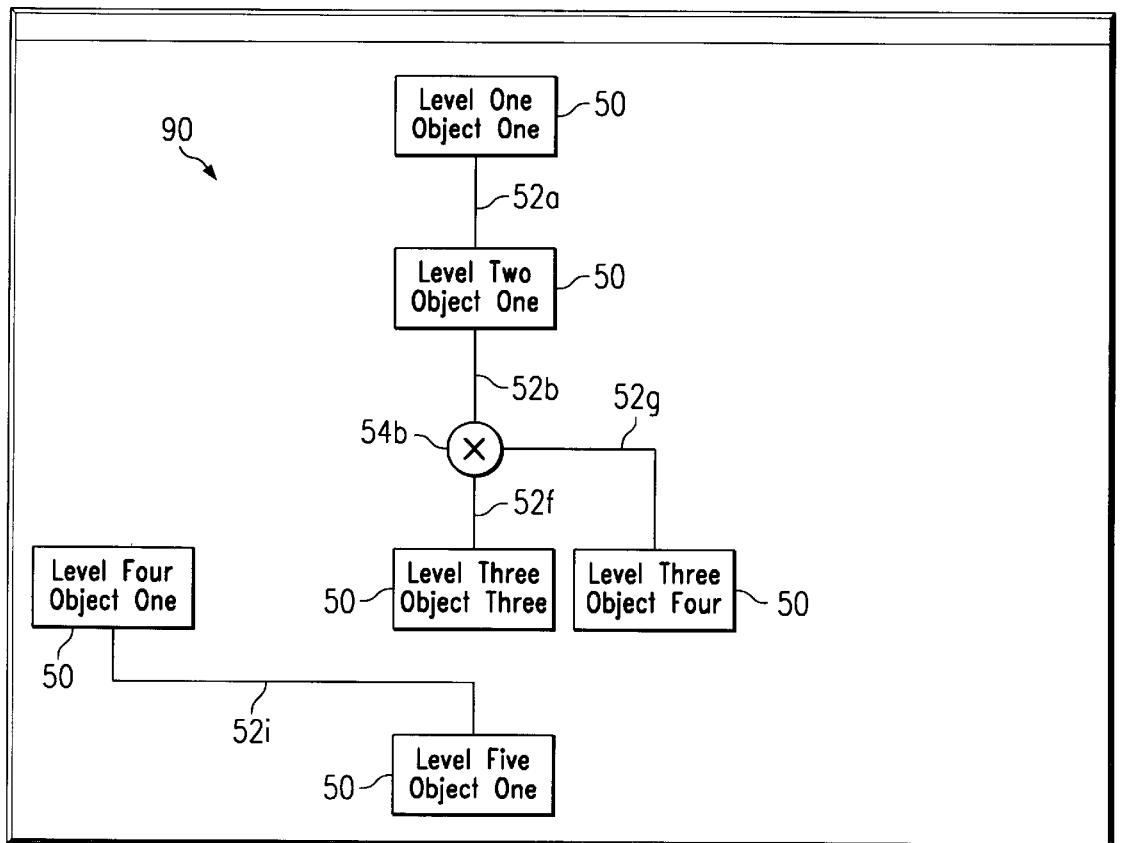

FIG. 4

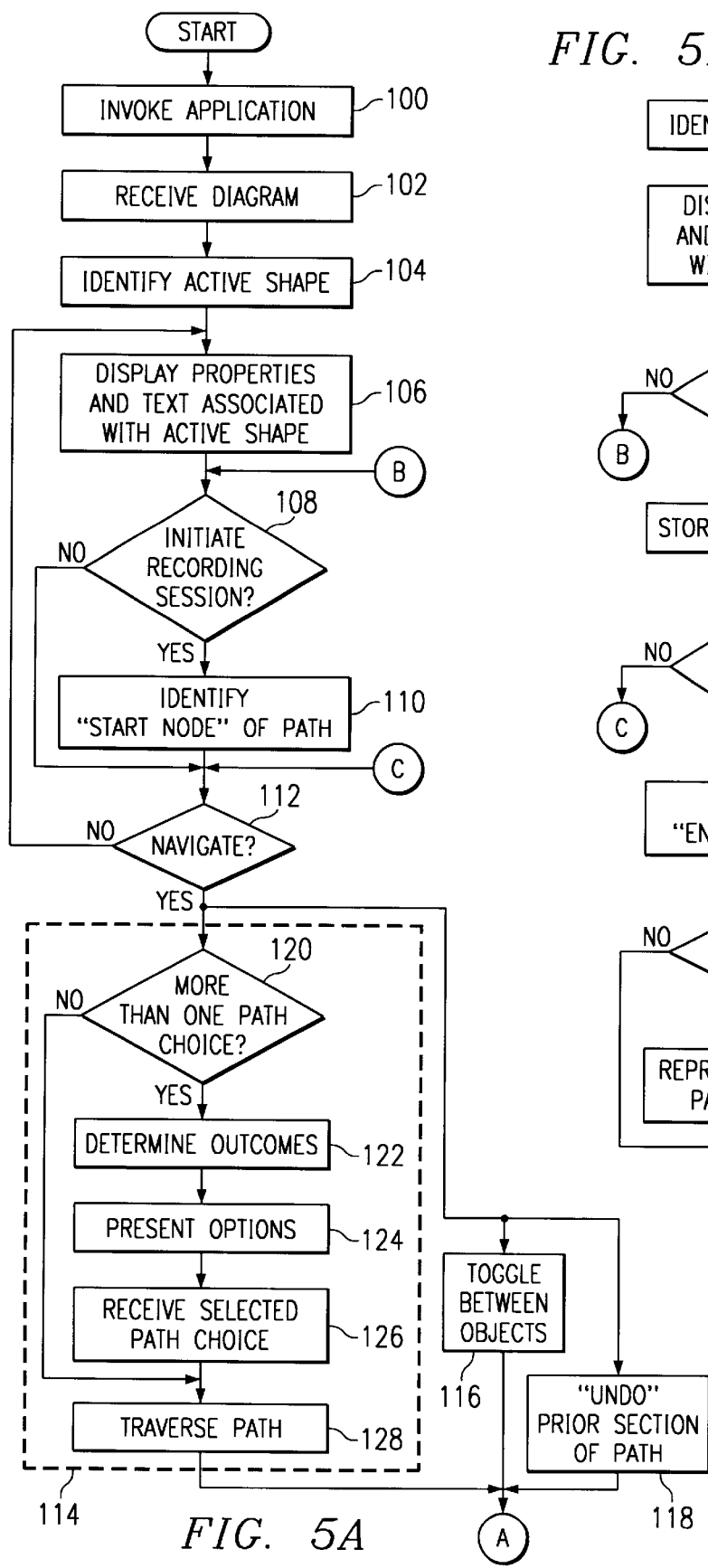
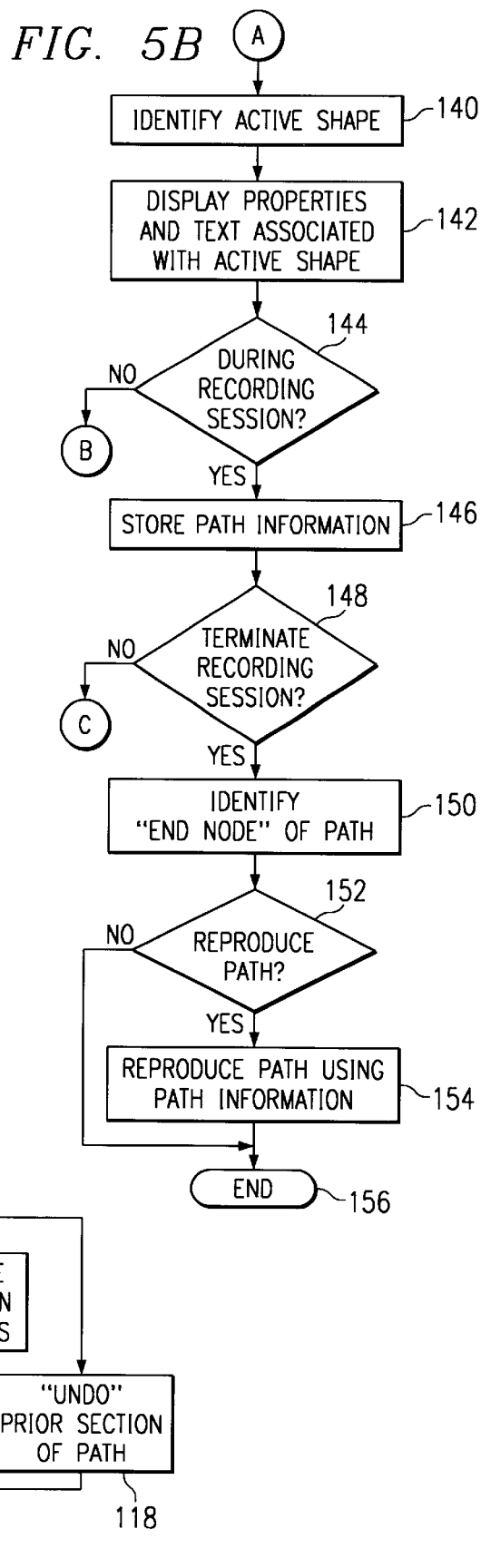
FIG. 5A
FIG. 5B

SYSTEM AND METHOD FOR DETERMINING A PATH IN A GRAPHICAL DIAGRAM

TECHNICAL FIELD OF THE INVENTION

This invention relates in general to computer is graphics systems, and more particularly to a system and method for determining a path in a graphical diagram.

BACKGROUND OF THE INVENTION

Graphical diagrams often include a combination of objects, lines, logical connectors, and other graphical shapes arranged according to a methodology to convey one or more functions, processes, structures, or organizations. Users unfamiliar with the structure or methodology of a particular graphical diagram often encounter difficulties navigating through the diagram to perform or understand a particular task. For example, a user not trained to interpret the meaning, functionality, or relationships of the objects, lines, logical connectors, and other graphical shapes of a graphical diagram may be unable to use the diagram efficiently or accurately.

Furthermore, although only a particular portion of a large or complex diagram may be required to perform a particular task, users of graphical diagrams are often required to understand the intricacies of the entire diagram to locate the pertinent portions. Accordingly, a user must often magnify a large diagram to view information associated with a particular graphical object or group of objects of a diagram, and demagnify the diagram to understand the relationship of the graphical objects with respect to the context of the entire diagram. Repeatedly magnifying and demagnifying the view of the graphical diagram also prohibits the use of the diagram efficiently or accurately.

SUMMARY OF THE INVENTION

In accordance with the present invention, a system for determining a path in a graphical diagram is provided which substantially eliminates or reduces disadvantages and problems associated with previous computer graphics systems.

In accordance with one embodiment of the present invention, a system for determining a path in a graphical diagram includes a memory that stores a graphical diagram having an arrangement of shapes. A processor coupled to the memory determines a path through a portion of the diagram. A display coupled to the processor displays the path.

Another embodiment of the present invention is a method for determining a path in a graphical diagram. The method includes selecting a first shape and presenting a plurality of second shapes to a user for selection. The method concludes by determining a path to a selected second shape.

In yet another embodiment of the present invention, a system operated by a user to traverse a path in a graphical diagram includes a display that displays a graphical diagram having an arrangement of shapes. A processor coupled to the display presents a user interface having navigation controls operated by a user to traverse a path in the graphical diagram.

Technical advantages of the present invention include a system that determines a path through a portion of a graphical diagram, records path information defining the path, and reproduces a copy of the path using the path information. In addition, the system provides a graphical user interface that serves as an interactive interface between a user and the system.

Users unfamiliar with the structure or methodology of a particular graphical diagram often are unable to make informed path-based decisions while navigating a path through the diagram. The present invention advantageously interprets the methodology of a particular graphical diagram, examines the relationships between objects, lines, logical connectors, and any other graphical shapes associated with a pending path-based decision confronted by a user while navigating the diagram, and determines the different paths that may be traversed by the user. For each path, the present invention determines the outcome or result of traversing that path and presents to the user the determined outcomes as a series of options in a textual, graphical, or otherwise suitable format. In this respect, the present invention aids the user to make informed path-based decisions and clarifies the process of navigating a large or complex graphical diagram. Additional advantages of the present invention include the ability to reverse the navigation of a traversed path to "undo" any path-based decisions previously made.

Other technical advantages of the present invention include establishing a recording session and storing path information for any paths that are traversed through the graphical diagram during the recording session. The path information includes information identifying the graphical shapes traversed by the path, and the properties of the graphical shapes. A copy of the traversed path may be reproduced in a new diagram using the stored path information. Therefore, the present invention allows a user to focus on a particular portion of a large or complex diagram by determining a path through the desired portion of the diagram, recording path information defining the path, and reproducing a copy of the path in a new diagram using the path information. The new diagram is often smaller, more simplified, and easier to understand than the original diagram. The new diagram may be manipulated, linked, and executed as a separate process, or may be navigated to understand a function, process, structure, or organization of the new diagram. Other technical advantages are readily apparent to one of skill in the art for the attached figures, description, and claims.

BRIEF DESCRIPTION OF THE DRAWINGS

For a more complete understanding of the present invention and its advantages, reference is now made to the following description taken in conjunction with the accompanying drawings, in which like reference numbers indicate like features and wherein:

FIG. 3 illustrates one embodiment of path information stored during a recording session of the present invention;

FIG. 4 illustrates a path reproduced using the path information; and

FIGS. 5A–5B illustrate a flowchart of a method for determining a path in a graphical diagram.

DETAILED DESCRIPTION OF THE INVENTION

Figure 1:
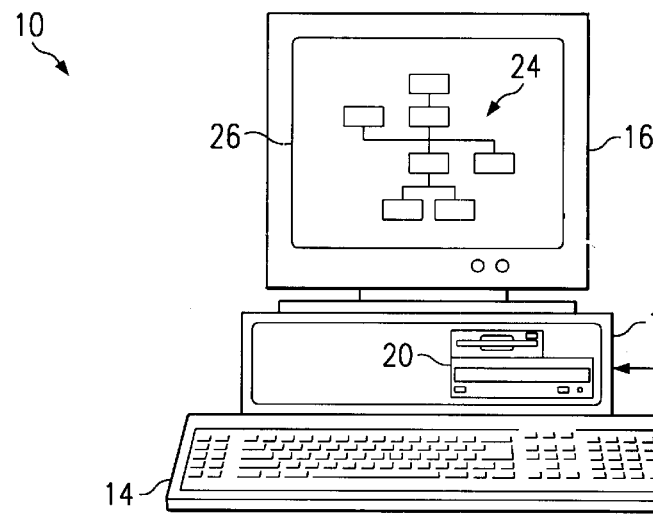
FIG. 1 illustrates a block diagram of a system for a determining a path in a graphical diagram in accordance with the present invention.

FIG. 1 illustrates a block diagram of a system 10 for determining a path through a portion of a graphical diagram 24. System 10 includes a processor 12 coupled to an input device 14, an output device 16, a memory 18, and a data retrieval device 20. In general, processor 12 executes an application 22 to determine a path through a portion of a graphical diagram 24, to record path information defining the path, and to reproduce a copy of the path using the path information.

Processor 12 comprises a central processing unit associated with a computer system, such as a mainframe, workstation, a laptop computer, a personal digital assistant, or any other suitable general purpose data processing facility. In general, processor 12 executes application 22 with any suitable operating system environment, such as, for example, MS-DOS, PC-DOS, OS2, MAC-OS™, UNIX™, or WINDOWS™.

Input device 14 comprises a keyboard, mouse, graphics tablet, touch screen, pressure sensitive pad, joystick, trackball, light pen, microphone, or any other suitable input device. Output device 16 comprises a cathode ray tube display, a liquid crystal display, a flat panel display, a printer, a plotter, or any other suitable output device. Output device 16 displays diagram 24 using a graphical user interface 26 ("GUI") associated with application 22. GUI 26 serves as an interactive interface between a user and application 22.

Memory 18 comprises a file, a stack, or any other suitable organization of volatile or non-volatile memory that stores application 22, diagram 24, and any associated files, tables, or buffers in RAM, ROM, CD-ROM, or any other form of magnetic or optical storage. For example, memory 18 stores path information 28 defining a path traversed through diagram 24 using application 22. Data retrieval device 20 may comprise a disc drive, a CD-ROM drive, a hard drive, or any other suitable magnetic or optical data retrieval device.

Application 22 comprises a software computer application having a set of instructions, procedures, and/or related data adapted for implementation in a suitable computer language such as, for example, Visual Basic, JAVA, C or C++, or any other appropriate development language. Application 22 may be a stand-alone application or delivered integral to or with other computer graphics applications.

Diagram 24 comprises any number and combination of objects, lines, logical connectors, and any other suitable graphical shapes arranged according to a methodology to convey graphically one or more functions, processes, structures or organizations in a logical format. In a particular embodiment of the present invention, diagram 24 includes multiple levels of objects coupled by lines and logical connectors in a hierarchical format to define a logical relationship between the graphical shapes. Diagram 24 may model a flowchart, an organizational chart, a pyramid chart, a VENN diagram, or any other suitable graphics-based chart or diagram.

In one aspect of operation, GUI 26 of application 22 presents a collection of navigation controls that support traversing a path that extends between the graphical shapes of diagram 24. Users unfamiliar with the structure or methodology of a particular diagram 24 often encounter difficulties navigating through diagram 24 to perform a desired task. For example, while navigating through a large or complex diagram 24, a user may confront any number and combination of logical connectors positioned between other graphical shapes. Each logical connector may present two or more alternative branches of a path that may be traversed through diagram 24. If the user is not trained to interpret the meaning and functionality of these logical connectors, the user may be unable to make informed path-based decisions.

Application 22 advantageously examines the relationships between the objects, lines, and logical connectors associated with a pending path-based decision according to the methodology of diagram 24, as well as any other graphical shapes, functions, or processes of diagram 24 that a user may be unable to interpret, and determines the outcome of each of the available alternative paths. For example, application 22 may determine that for a particular path-based decision confronted by a user, up to three different paths may be traversed. For each path, application 22 determines the outcome or result of traversing that path and presents to the user in GUI 26 the determined outcomes as a series of options in a textual, graphical, or otherwise suitable format. Application 22 receives from the user a selection of one or more of the path options and, in response, traverses the appropriate path to the desired outcome. An advantage of this aspect of system 10 is that application 22 interprets the methodology of diagram 24 and the relationships among the graphical shapes of diagram 24 to aid the user in making informed path-based decisions. In this respect, application 22 clarifies the process of navigating a large or complex diagram 24.

Although the previous description of application 22 is detailed with reference to traversing a path through a portion of diagram 24 in response to user input, application 22 may also traverse a path through diagram 24 in response to a computer algorithm or macro; the execution of another computer application; the traversal of another path; or in response to any other set of triggers, instructions, or functions generated by a user or a computer. For example, application 22 may traverse a path through diagram 24 in response to a computer algorithm that models business logic to generate the optimal path-based decisions to perform a particular task.

In another aspect of operation, GUI 26 provides recording controls that establish a recording session. Application 22 stores path information defining any paths traversed during the recording session. In one embodiment, prior to traversing a path, application 22 initiates a recording session in response to the activation of a "start recording" button presented by GUI 26. As a path is traversed through diagram 24 during the recording session, application 22 adds color, shading, arrows, or some other visual indication of the path. Furthermore, application 22 stores path information 28 in memory 18 that defines the properties, relationships, and functions of the objects, lines, logical connectors, and other graphical shapes of diagram 24 traversed during the recording session, including any path-based decisions made during the recording session. After traversing all or a portion of diagram 24, application 22 terminates the recording session in response to the activation of a "stop recording" button presented by GUI 26.

An advantage of this aspect of system 10 is that application 22 may reproduce a copy of the path traversed during the recording session using path information 28. In one embodiment, application 22 reproduces a copy of the traversed path in a new diagram to present the traversed portion of diagram 24 more clearly. In a particular embodiment, application 22 removes any unnecessary turns and segments of lines, logical connectors, or other graphical shapes to present a cleaner graphical representation of the new diagram. Therefore, application 22 allows a user to focus on a portion of a large or complex diagram 24 by determining a path through the desired portion of diagram 24, recording path information defining the path, and reproducing a copy of the path in a new diagram using path information 28. The new diagram is often smaller, more simplified, and easier to understand than the original diagram 24.

The new diagram may be executed, linked, and manipulated as a separate process, or navigated to understand a function, process, structure, or organization of the new diagram. For example, the graphical shapes of the new diagram maintain some or all of the same properties and relationships as the corresponding shapes of diagram 24 so that if a particular graphical shape of diagram 24 performs a function upon, communicates with, or links to another shape of diagram 24, another diagram of application 22, a database, or any other application or storage facility of system 10, then the corresponding graphical shape of the new diagram also supports these processes.

Additional graphics tools presented by GUI 26 of application 22 support "undoing" a particular section of a traversed path and traversing a "discontinuous" path through diagram 24. For example, GUI 26 provides graphics tools that support "undoing" a traversed path by navigating upstream against the flow of an already traversed path to a particular position of diagram 24, such as to a previously traversed shape, and traversing a different path through diagram 24 to modify any previously made path-based decisions. Path information 28 stored by application 22 during the recording session reflects any such modifications. GUI 26 further provides graphics tools that support traversing a "discontinuous" path through diagram 24. For example, a user may stop traversing a path through diagram 24 at a first shape during a recording session and recommence traversing the path at a second shape not immediately connected to the first shape. Path information 28 stored by application 22 during the recording session, and therefore any paths reproduced using path information 28, reflects the discontinuous nature of such a path.

Figure 2A:
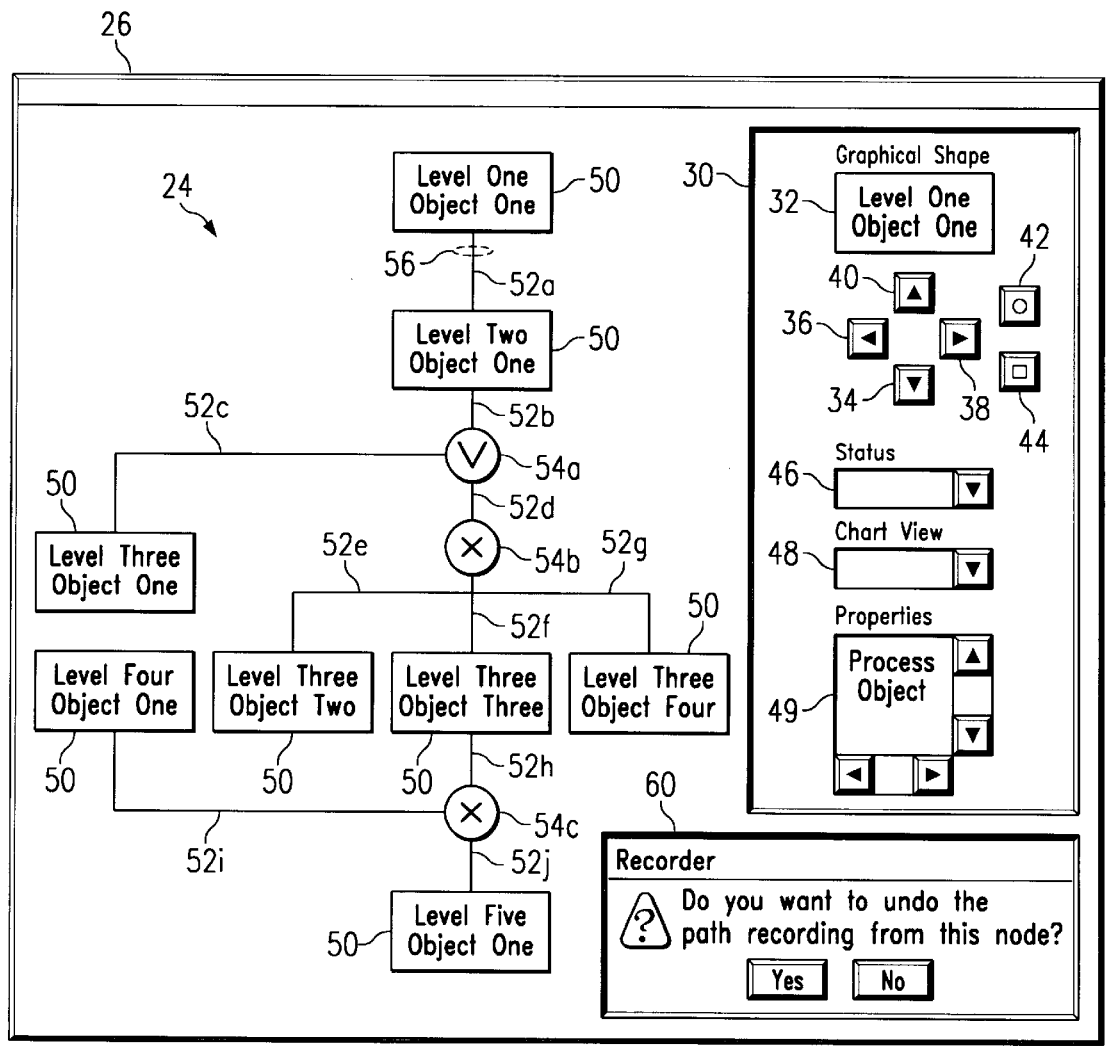
FIGS. 2A–2B illustrate one embodiment of a graphical user interface that may be used in the system.

FIG. 2A illustrates one embodiment of GUI 26 presented by application 22 for use in system 10. GUI 26 presents diagram 24 and a toolbox 30 comprising a collection of tools 32–49 that support determining, traversing, and recording a path 56 through a portion of diagram 24.

Diagram 24 comprises any number and combination of graphical shapes arranged according to a methodology to convey graphically one or more functions, processes, structures or organizations in a logical format. A graphical shape may comprise an object 50, a line 52, a logical connector 54, or any other suitable graphical component of diagram 24. Objects 50 may comprise process objects, decision objects, input/output objects, event objects, function objects, link objects, or any other type of object 50 suitable for use in diagram 24. Lines 52 couple objects 50 and logical connectors 54. Logical connectors 54 comprise "AND" functions, "OR" functions, exclusive-or functions ("XOR"), or any other suitable logical functions that couple objects 50 and lines 52 to indicate process flows, relationships, hierarchies, and branches of diagram 24.

A path 56 generally defines the flow of navigation through a subset of objects 50, lines 52, logical connectors 54, or other graphical shapes of diagram 24, collectively referred to hereinafter as "path components". Each path 56 comprises a series of concatenated path sections. Each path section extends from a first object 50 of diagram 24 to a second object 50 of diagram 24 and includes any intervening path components. In a particular embodiment of the present invention, lines 52 and logical connectors 54 couple objects 50 among multiple levels of diagram 24 to define a logical organization or grouping of graphical shapes.

Figure 2B:
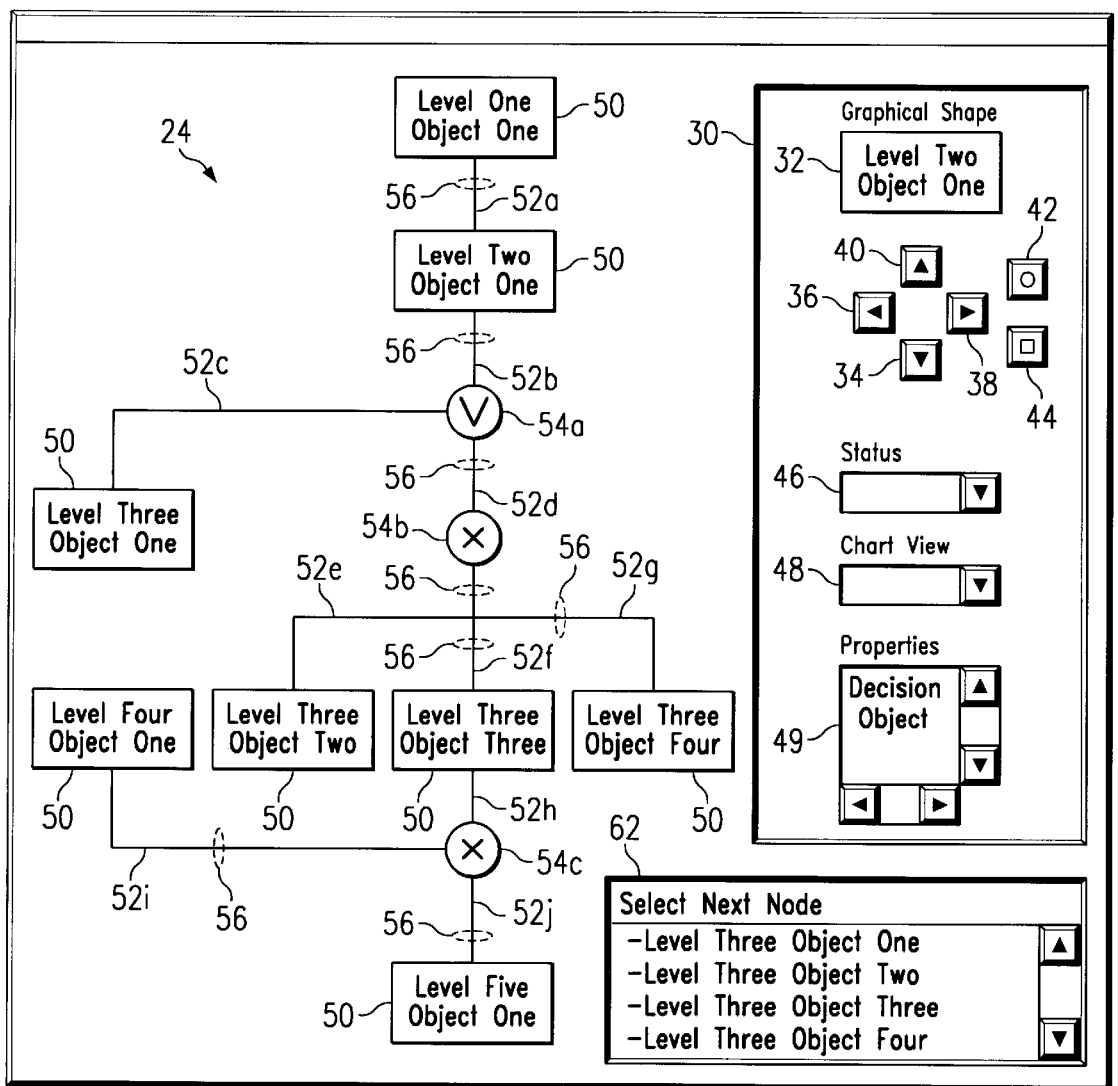

Throughout the description of FIGS. 2A and 2B, objects 50 are referred to generically according to the various levels of a diagram 24 and the objects 50 of a particular level, (e.g., "Level One Object One"), to illustrate a hierarchical association and relationship of objects 50 in an exemplary diagram 24. It should be understood, however, that objects 50 may be arranged among multiple levels of diagram 24 to define generally any logical organization or grouping of graphical shapes, and that objects 50 may have other textual or graphical identifiers that provide meaning within the context of a particular diagram 24. For example, if diagram 24 models a business organization, objects 50 may be identified according to the components of the business organization, (e.g., "President," "Chief Operating Officer," "Manager," etc). Similarly, if diagram 24 is a flow chart of a business process, then objects 50 may be identified according to the steps of execution of the business process, (e.g., "Receive Product Orders," "Review Inventory," "Ship Product," etc).

Toolbox 30 includes a graphical shape viewer 32, navigation controls 34–40, recording controls 42–44, a status viewer 46, a chart viewer 48, and a properties viewer 49. Graphical shape viewer 32 comprises a window that displays text or labels associated with a selected object 50, line 52, logical connector 54, or any other graphical shape of diagram 24. Graphical shape viewer 32 provides the particular advantage of allowing a user to view information identifying a particular graphical shape even though that shape may be a small component of a large diagram 24. Therefore, graphical shape viewer 32 eliminates the necessity to magnify diagram 24 to identify a particular graphical shape and to demagnify diagram 24 to view the graphical shape in the context of diagram 24.

Navigation controls 34–40 comprise directional buttons such as a down button 34, a left button 36, a right button 38, and an up button 40, or any other suitable buttons or controls that support navigating through diagram 24. Down button 34 supports traversing a path through diagram 24 between a first object 50 of a particular level of diagram 24 and a second object 50 of a subsequent level of diagram 24. For example, down button 34 supports navigating a path from the object 50 labeled, "Level One Object One," to the object 50 labeled, "Level Two Object One." Left button 36 and right button 38 support navigating between objects 50 of a particular level of diagram 24. For example, buttons 36 and 38 support navigating between objects 50 of "Level Three." Up button 40 supports "undoing" a section of a traversed path 56 by navigating back through path 56 from a first object 50 of a particular level of diagram 24 to a second object 50 of a preceding level of diagram 24. For example, up button 40 supports "undoing" a section of the traversed path 56 by navigating back through path 56 from the object 50 labeled, "Level Two Object One," to the object 50 labeled, "Level One Object One."

Recording controls 42–44 comprise a "start recording" button 42 and a "stop recording" button 44. The activation of "start recording" button 42 initiates a recording session. Application 22 stores path information 28 for the path traversed during the recording session. The activation of "stop recording" button 44 terminates the recording session and, in one embodiment, queries the user to indicate whether to reproduce a copy of any paths traversed during the recording session using path information 28. Status viewer 46 supports activating or deactivating a particular graphical shape of diagram 24 selected by a user. Chart viewer 48 supports multiple viewing options for diagram 24. Properties viewer 49 comprises a window that displays properties for a selected graphical shape of diagram 24.

In general, application 22 determines a path 56 through a portion of diagram 24 in response to user input communicated via tools 32–49, a computer algorithm or macro, the execution of other applications, the traversal of another path, or in response to any other set of triggers, instructions, or functions generated by a user or computer. Application 22 may initiate a recording session and store path information 28 for a path 56 traversed during the recording session. Upon terminating the recording session, application 22 may reproduce a copy of path 56 in a new diagram.

The following description of GUI 26 details the traversal of an exemplary path 56 through a portion of a diagram 24 to illustrate the features and functions of system 10. Throughout this description, the term "active shape" refers generally to that graphical shape of diagram 24 which is currently selected by the user or upon which execution is presently being performed. Although the example is described with reference to navigating through diagram 24 during a recording session, it should be understood that the navigating techniques of system 10 also apply outside of a recording session.

Referring now to a more detailed operation of GUI 26, application 22 determines the active shape of diagram 24 as the object 50 labeled "Level One Object One." Graphical shape viewer 32 displays information identifying the active shape, and properties viewer 49 displays the properties of the active shape. Application 22 initiates a recording session and identifies the active shape as a "start node" of path 56 upon detecting the activation of "start recording" button 42. Therefore, the "start node" of exemplary path 56 comprises the object 50 labeled "Level One Object One."

Directional buttons 34–40 support navigating a path 56 through diagram 24. In one embodiment, the position of the active shape in diagram 24 determines whether a particular directional button 34–40 is active. For example, in the middle of a diagram 24, all buttons 34–40 may be available, whereas at the beginning of a diagram 24, only down button 24 may be available. From the active shape labeled "Level One Object One," only one path choice is available to traverse. Therefore, only down button 34 among directional buttons 34–40 is active. Upon detecting the activation of down button 34, application 22 traverses a path 56 that extends from the object 50 labeled "Level One Object One" to the object 50 labeled "Level Two Object Two," and includes any other intervening path components. Since path 56 was traversed during a recording session, application 22 stores path information 28 identifying each path component using a flag, a pointer, or any other suitable identifier. In one embodiment, application 22 stores path information 28 remotely in a table or file of memory 18. In another embodiment, application 22 stores path information 28 locally in application 22. Path information 28 includes the properties, relationships, and functions of the components of path 56.

From the active shape labeled "Level Two Object One," the user may proceed with the navigation of a path 56 through diagram 24 by activating down button 34, or may reverse the navigation of path 56 to "undo" the previously traversed section of path 56 by activating up button 40. If the user activates up button 40, application 22 presents a dialogue box 60 to confirm the user command. If the user elects to "undo" the path recording from the object 50 labeled "Level One Object One" to the object 50 labeled "Level Two Object One," application 22 modifies path information 28 accordingly to reflect the "undoing" of the previously made path-based decision.

Referring now to FIG. 2B, if the user activates down button 34, application 22 examines lines 52, logical connectors 54, and any other graphical shapes of diagram 24 positioned between the active shape labeled "Level Two Object One" and the objects 50 of "Level Three" to determine the possible outcomes of the path-based decision confronted by the user. Application 22 provides to the user a dialogue box 62 presenting the available options for each of the alternative paths as "Level Three Object One," "Level Three Object Two" "Level Three Object Three" and "Level Three Object Four." Again, objects 50 presented as options in dialogue box 62 are referred to generically according to level number and object number for illustrative purposes only, and it should be understood that objects 50 may be referred to specifically to describe the meaning of a function, process, or event associated with object 50 in the context of diagram 24.

Application 22 determines and traverses the appropriate path 56 to reach the object 50 selected by the user in dialogue box 62. For example, if the user selects object 50 labeled "Level Three Object Three," application 22 determines an appropriate path 56 from the active shape labeled "Level Two Object One" to the destination object 50 labeled "Level Three Object Three," and traverses the determined path 56 as illustrated in FIG. 2B.

In one embodiment, the object 50 labeled "Level Three Object Three" may comprise an object that indicates a "link" to a destination shape such as, for example, to another graphical shape of diagram 24 or to a graphical shape of another diagram 24 of system 10. In this embodiment, application 22 determines and traverses a path from object 50 labeled "Level Three Object Three" to the destination shape in response to the activation of down button 34. Application 22 displays the destination shape and portions of the associated diagram 24 from where navigation may continue. The activation of up button 40 from this position causes application 22 to "undo" the previously traversed "link," and returns navigation to the object 50 labeled "Level Three Object Three."

An important advantage of system 10 is that application 22 processes any number and combination of objects 50, lines 52, logical connectors 54, and any other graphical shapes of diagram 24 according to the methodology of diagram 24, as illustrated in the particular embodiment of FIG. 2B, to determine the available path options so that the user, who may be unable to process the logical relationships between objects 50 and determine the available path options manually, may still make intelligent and informed path-based decisions while navigating diagram 24. Another advantage provided by this aspect of system 10 is that in addition to determining the available path options to a path-based decision confronted by the user, application 22 determines a logical path 56 from the active shape to a destination object 50 and traverses the determined path 56.

One of many reasons for navigating a path 56 through a portion of diagram 24 and reproducing the path 56 in a new diagram using application 22 is to focus upon selected portions of a large or complex diagram 24 to perform or understand a particular task, function, or process. The operation or understanding of the pending task, function, or process may, however, necessitate the preservation of multiple path options to a path-based decision confronted by a user of diagram 24. For example, if a diagram 24 models the execution of a business process that includes a decision object the outcomes of which may include three alternative event objects, then the operation of a particular business function may necessitate the preservation of the original decision object and two of the alternative event objects. To support this functionality, application 22 may traverse a path having multiple branches of sub-paths that model the alternative path options available for a particular path-based decision.

Referring back to FIG. 2B to describe this functionality of system 10, application 22 may traverse a primary path from the object 50 labeled "Level Two Object One" to the object 50 labeled "Level Three Object Three" and then return execution to the object 50 labeled "Level Two Object One" in response to a double click of a mouse input device 14, or any other input activity indicating a return of execution to the object 50 labeled "Level Two Object One." Application 22 may then traverse a secondary path extending from the active shape labeled "Level Two Object One" to the object 50 labeled "Level Three Object Four," for example, in response to such a selection made by the user in dialogue box 62. Application 22 stores path information 28 for both the primary and secondary paths 56, and graphically displays each path 56 using GUI 26, as illustrated in FIG. 2B. An advantage of this aspect of system 10 is that application 22 supports traversing multiple sub-paths of a primary path 56.

From the active shape labeled "Level Three Object Four," application 22 supports toggling between objects 50 of "Level Three" in response to the activation of left button 36 or right button 38. For example, if the user activates left button 36, application 22 determines object 50 labeled "Level Three Object Three" as the active shape. In a particular embodiment, if the user activates any combination of left button 36 or right button 38 to reach an object 50 of "Level Three" not already a part of path 56, application 22 may query the user whether to record path 56 from the object 50 labeled "Level Two Object One," to the selected object 50. This provides an alternative method by which the user may traverse a path 56 to a particular object 50.

In addition to traversing a path 56 having multiple sub-paths branching out from a primary path, application 22 may traverse a path 56 having multiple paths branching into the primary path. Therefore, application 22 advantageously permits a user to record a path 56 having "discontinuous nodes." For example, a user may terminate path 56 at a first node, such as at the object 50 labeled "Level Three Object Three," and recommence path 56 at a second node, such as at the object 50 labeled "Level Four Object One," separate from the first node. From object 50 labeled "Level Four Object One," the user may activate down button 34 to traverse a path 56 from object 50 labeled "Level Four Object One" to the object 50 labeled "Level Five Object One." Application 22 stores path information 28 that reflects the discontinuous nature of such a path 56. An advantage of this aspect of application 22 is that a user may customize the flow of execution or progression through a diagram 24.

FIG. 3 illustrates path information 28 generated by application 22. Although path information 28 is illustrated in the form of a table in FIG. 3, path information 28 may be stored in any suitable organization of memory. Path information 28 includes information stored for a path 56 traversed during a recording session of system 10. In one embodiment, path information 28 includes shape identifier information 70 such as text, labels, or some other identifier of each graphical shape in diagram 24. For example, information 70 includes an identifier for an object 50, a line 52, a logical connector 54, and any other graphical shape of diagram 24.

Path information 28 further includes status information 72 such as a flag, a pointer, or some other indication of whether a particular graphical shape of diagram 24 is a component of path 56. Although the description of path information 28 is detailed with reference to maintaining status information of a particular graphical shape for a single path 56, application 22 may store path information indicating whether a particular graphical shape is a component of multiple paths 56 traversed during the same or different recording sessions of system 10. In this embodiment, path information 28 indexes each graphical shape of diagram 24 according to each of the different paths 56 traversed by application 22.

Path information 28 further includes properties information 74 such as information regarding the properties, relationships, and functions of objects 50, lines 52, logical connectors 54, and any other graphical shapes of path 56 as embodied in diagram 24. An important advantage of this aspect of system 10 is that application 22 may use path information 28 to reproduce path 56 of diagram 24 in a new diagram, as described in more detail below with reference to FIG. 4. The graphical shapes of the new diagram may maintain some or all of the same properties, relationships, and functions of the corresponding shapes in the original diagram 24.

FIG. 4 illustrates a diagram 90 reproduced from path 56 of diagram 24 using path information 28 stored during a recording session, as described above with reference to FIGS. 2A and 2B. Diagram 90 maintains some or all of the same properties and relationships of objects 50, lines 52, logical connectors 54, and any other graphical shapes of path 56 as embodied in the original diagram 24. For example, path 56 of diagram 90 represents the discontinuous nature of path 56 traversed through diagram 24 as described above with reference to FIGS. 2A and 2B.

Furthermore, if a particular shape of diagram 24 communicates with or performs a function upon another shape of diagram 24, another diagram of application 22, a database, or any other application or storage facility of system 10, then the corresponding shape of diagram 90 also supports these activities. For example, if a particular function object 50 of diagram 24 accesses a remote database of system 10 to retrieve data, then the corresponding object 50 of diagram 90 performs the same "database access" function as the original object 50 of diagram 24. In another example, if a shape of diagram 24 comprises a "link" that indicates an entry or exit point between multiple segments of diagram 24; between multiple diagrams of application 22; or between a diagram of application 22 and a database, another application, or any other component of system 10, then the corresponding shape of diagram 90 comprises the same "link" to perform the same function as the original shape of diagram 24.

In a particular embodiment of system 10, application 22 advantageously removes any unnecessary turns and segments of lines 52, logical connectors 54, or other graphical shapes to present a cleaner graphical representation of the new diagram 90. For example, application 22 removes logical connector 54a between the object 50 labeled "Level Two Object One" and the object 50 labeled "Level Three Object One" of original diagram 24 since application 22 did not traverse a path 56 between those objects 50 as described in the exemplary traversal of path 56 detailed with reference to FIGS. 2A and 2B. It is noted, however, that application 22 maintains the logical connector 54b between the object 50 labeled "Level Two Object One" and the objects 50 labeled "Level Three Object Three" and "Level Three Object Four," to maintain the logical relationships between these objects 50 as originally embodied in diagram 24. Therefore, application 22 may reproduce in a new diagram 90 a simplified and often easier to understand copy of a path 56 traversed during a recording session, while still maintaining the properties, relationships, and functions of the path components as embodied in diagram 24.

In another embodiment of the present invention, application 22 may insert a copy of path 56 into an existing graphical diagram. In this embodiment, application 22 may synchronize the flow of execution through the new diagram including the reproduced path 56 using the appropriate links, pointers, and logical connectors.

FIGS. 5A and 5B are flow charts of an exemplary method for traversing a path 56 through a portion of graphical diagram 24. Referring to FIG. 5A, a user invokes application 22 at step 100. Application 22 supports determining a path 56 through a portion of graphical diagram 24, recording path information 28 defining path 56, and reproducing a copy of path 56 using path information 28. Application 22 receives diagram 24 at step 102 and identifies a selected graphical shape as the active shape at step 104. Furthermore, application 22 displays the identifying information and properties associated with the active shape using viewers 32 and 49 of GUI 26 at step 106.

Application 22 determines whether to initiate a recording session at step 108. If a recording session is initiated at step 108, application 22 identifies the active shape as the "start node" of path 56 at step 110. Upon identifying the "start node" of path 56 at step 110 or if a recording session is not initiated as determined at step 108, execution proceeds to step 112 where application 22 determines whether to navigate through a portion of diagram 24. In particular, application 22 determines whether any of down button 34, left button 36, right button 38, or up button 40 is activated. If not, execution returns to step 106. If so, execution proceeds to one of three different methods illustrated by steps 114, 116, and 118 depending upon which directional button 34–40 is activated.

Referring to steps 114, application 22 determines whether the user is confronted with a path-based decision between more than one path choice at step 120 in response to the activation of down button 34. If so, application 22 examines objects 50, lines 52, logical connectors 54, and any other graphical shapes of diagram 24 according to the methodology of diagram 24 to determine the outcomes of the path-based decisions confronted by the user, at step 122. Application 22 presents the available options for each of the alternative paths at step 124 in a textual, graphical, or otherwise suitable format and receives a selected path choice at step 126. Upon receiving the selected path choice at step 126, or if the user is not confronted with a path-based decision presenting more than one path choice as determined at step 120, execution proceeds to step 128 where application 22 traverses the proper path to reach the appropriate object 50. Although the flowchart of FIGS. 5A and 5B is illustrated with reference to traversing a path 56 through a portion of diagram 24 in response to user input, application 22 may traverse a path in response to triggers, instructions, or functions generated by a user or a computer. Execution then proceeds to step 140.

Referring to step 116, application 22 toggles between objects 50 of a particular level of diagram 24, in response to the activation of either left button 36 or right button 38. This feature allows a user to select a particular object 50 within a particular level of diagram 24 as the active shape and further provides an alternative method by which the user may traverse a path 56 to a particular object 50. Execution then proceeds to step 140.

Referring to step 118, application 22 navigates upstream against the flow of the traversed path 56 to "undo" the prior section of path 56, in response to the activation of up button 40. An advantage of system 10 provided by this particular feature is that a user may reverse the navigation of a traversed path 56 to a particular graphical shape to "undo" any path-based decisions previously made, for example, during steps 114. Execution then proceeds to step 140.

Referring now to FIG. 5B, application 22 identifies the graphical shape to which the user navigated during steps 114, 116, or 118 as the active shape at step 140. Application 22 displays the text and properties associated with the active shape using viewers 32 and 49 of GUI 26 at step 142. Application 22 determines whether steps 114, 116, or 118 were executed during a recording session at step 144. If not, execution returns to step 108 where application 22 determines whether to initiate a recording session. If steps 114, 116, or 118 were executed during a recording session, as determined at step 144, application 22 stores path information 28 for path 56 at step 146. For example, if the user traversed a path 56 according to steps 114 or 116, application 22 stores path information 28 associated with the objects 50, lines 52, logical connectors 54, and other graphical shapes of the traversed path 56. If the user reversed the navigation of path 56 according to step 118, application 22 modifies the stored path information 28 accordingly to reflect the "undoing" of the previously made path-based decision.

Application 22 determines whether to terminate the recording session at step 148. If the recording session is not to be terminated, execution proceeds to step 112. If so, execution proceeds to step 150 where application 22 identifies the active shape as the "end node" of path 56. As a result, path 56 is defined by the flow of navigation from the "start node" through the "end node," including any objects 50, lines 52, logical connectors 54, and other intervening graphical shapes of diagram 24.

Application 22 determines whether to reproduce path 56 at step 152. If so, application 22 retrieves path information 28 associated with path 56 and reproduces a copy of path 56 in a new diagram 90 at step 154. Upon reproducing the copy of path 56 or if path 56 is not to be reproduced as determined at step 152, execution terminates at step 156.

Although the present invention has been described with several embodiments, a myriad of changes, variations, alterations, transformations and modifications may be suggested to one skilled in the art, and it is intended that the present invention encompasses such changes, variations, alterations, transformations, and modifications as fall within the spirit and scope of the appended claims.

What is claimed is:

1. A system for determining a path in a graphical diagram, comprising:
    a memory operable to store a graphical diagram having an arrangement of shapes, the diagram comprising a first level having a first shape and a second level having a plurality of second shape;
    a processor coupled to the memory and operable to determine a path through a portion of the diagram and to store path information for the path, the path information comprising an identifier for each shape traversed by the path, the processor further operable to generate a second graphical diagram using the path information and to present the plurality of second shapes to a user for selection, the second graphical diagram comprising the shapes traversed by the path and a plurality of path segments linking the shapes traversed by the path, the path segments determined based on path segments indicated in the graphical diagram; and
    a display coupled to the processor and operable to display the path by displaying the second graphical diagram such that the display indicates the selected path segments traversed between the shapes by the path.

2. The system of claim 1, wherein:

the diagram comprises a plurality of shapes arranged in a plurality of levels; and the path comprises a plurality of path sections extending between adjacent levels.

3. The system of claim 2, wherein the path comprises more than one path section extending between a first level and a second level adjacent to the first level.

4. The system of claim 2, wherein the path comprises a plurality of path sections extending between shapes traversed by the path.

5. The system of claim 1, wherein the processor is further operable to determine the plurality of second shapes based upon a logical relationship between the first shape and a second shape.

6. The system of claim 1, wherein:

the diagram comprises a first shape and a plurality of second shapes; and the display is further operable to display a path section to a second shape selected in response to user input.

7. The system of claim 1, wherein the path is discontinuous, such that at least one of the shapes traversed in the path is not linked to the other shapes by the path segments linking the shapes in the second graphical diagram.

8. The method of claim 9, wherein the path is discontinuous, such that at least one of the shapes traversed in the path is not linked to the other shapes by the path segments linking the shapes in the second graphical diagram.

9. A method for determining a path in a graphical diagram, the diagram comprising a first level having a first shape and a level having a plurality of second shape, the method comprising:

selecting the first shape;

presenting the plurality of second shapes to a user for selection;

determining a path to a selected second shape, the path comprising a plurality of path sections extending between shapes traversed by the path;

storing path information for the path, the path information comprising an identifier for each of the shapes traversed by the path;

generating a second graphical diagram using the path information, the second graphical diagram comprising the shapes traversed by the path and a plurality of path segments linking the shapes traversed by the path, the path segments determined based on path segments indicated in the graphical diagram; and displaying the second graphical diagram in a manner to indicate the selected path segments traversed between the shapes by the path.

10. The method of claim 9, further comprising determining the plurality of second shapes based upon a logical relationship between the first shape and a second shape.

11. The method of claim 9, wherein:

the diagram comprises a plurality of shapes arranged in a plurality of levels; and the path comprises a plurality of path sections extending between adjacent levels.

12. The method of claim 11, wherein the path comprises more than one path section extending between a first level and a second level adjacent to the first level.

13. A computer graphics program for determining a path in a graphical diagram, the diagram comprising a first level having a first shape and a second level having a plurality of second shapes, the program encoded on a computer-readable medium and operable to excuse the following steps:

selecting the first shape;

presenting the plurality of second shapes to a user for selection;

determining a path to a selected second shape, the path comprising a plurality of path sections extending between shapes traversed by the path;

storing path information for the path, the path information comprising an identifier for each of the shapes traversed by the path;

generating a second graphical diagram using the path information, the second graphical diagram comprising the shapes traversed by the path and a plurality of path segments linking the shapes traversed by the path, the path segments determined based on path segments indicated in the graphical diagram; and displaying the second graphical diagram in a manner to indicate the selected path segments traversed between the shapes by the path.

14. The computer graphics program of claim 13, the program further operable to determine the plurality of second shapes based upon a logical relationship between the first shape and a second shape.

15. The computer graphics program of claim 13, wherein:

the diagram comprises a plurality of shapes arranged in a plurality of levels; and the path comprises a plurality of path sections extending between adjacent levels.

16. The computer graphics program of claim 15, wherein the path comprises more than one path section extending between a first level and a second level adjacent to the first level.

17. The computer graphics program of claim 13, wherein the path is discontinuous, such that at least one of the shapes traversed in the path is not linked to the other shapes by the path segments linking the shapes in the second graphical diagram.

18. A system operated by a user to traversed a path in a graphical diagram comprising:

a display operable to display a graphical diagram having an arrangement of shapes, the diagram comprising a first level having a first shape and a second level having a plurality of second shapes; and a processor coupled to the display and operable to present a user interface having a plurality of navigation controls operated by a traversed a path in the graphical diagram and operable to present the plurality of second shapes to the user for selection, the user interface further including a recording control to establish a recording session, wherein the processor is further operable to store path information for a path traversed during the recording session and to generate a second graphical diagram using the path information, the second graphical diagram comprising the shapes traversed by the path and plurality of path segments linking the shapes traversed by the path, segments determined based on path segments indicated in the graphical diagram;

wherein the display is further operable to display a second graphical diagram generated using the path information by the displaying the second graphical diagram such that the display indicates the selected path segments traversed between the shapes by the path.

19. The system of claim 18, wherein:

the diagram comprises a plurality of shapes arranged in a plurality of levels; and the navigation controls comprise a control to traverse a path extending between adjacent levels.

20. The system of claim 18, wherein:

the diagram comprises a plurality of shapes arranged in a plurality of levels; and the navigation controls comprise a control to undo a path extending between adjacent levels.

21. The system of claim 18, wherein:

the diagram comprises a plurality of shapes arranged in a plurality of levels; and the navigation controls comprise a control to select among a plurality of shapes of a particular level.

22. The system of claim 18, wherein:

the diagram comprises a first shape and a plurality of second shapes; and the display is further operable to present the plurality of second shapes to the user for selection.

23. The system of claim 18, wherein the recording control comprises a start recording button to initiate the recording session.

24. The system of claim 18, wherein the recording control comprises a stop recording button to terminate the recording session.

25. The system of claim 18, wherein the display is further operable to present information associated with a selected shape.

26. The system of claim 18, wherein the path is discontinuous, such that at least one of the shapes is transversed in the path is not linked to the other shapes by the path segments linking the shapes in the second graphical diagram.

* * * * *